_United States Patent Office_

3,520,655
Patented July 14, 1970

3,520,655
METHOD OF PRODUCING MAGNESIA OF DESIRED COMPOSITION FROM NATIVE MAGNESITE
Friedrich Nemec, Leoben, Styria, Austria, assignor to Veitscher Magnesitwerke-Actien-Gesellschaft, a corporation of Austria
No Drawing. Filed Aug. 24, 1967, Ser. No. 662,900
Claims priority, application Austria, Aug. 26, 1966,
A 8,133/66
Int. Cl. C01f 5/06
U.S. Cl. 23—201                                    3 Claims

ABSTRACT OF THE DISCLOSURE

Caustically burned native magnesite containing sufficient silica and alumina to make the end product useful as a calcined magnesia refractory is treated with hydrogen chloride gas in a controlled temperature range between 800° C. and 1100° C. in the absence of combustible or reducing gases to drive off the iron and manganese components in the form of its chlorides. The reaction is so controlled that the amount of the chlorides remaining in an intermediate product is such that they may be removed by suitable after-treatments to obtain the calcined magnesia of a desired chemical analysis. At least a large part of the hydrogen chloride gas is recovered.

---

Modern steel making processes use ever higher temperatures which require constantly increasing refractory qualities of the reaction vessel linings. The tendency has been to achieve this by using calcined or dead-burned magnesia of ever higher purity as refractory bricks for steel-making vessels and other uses requiring refractory shapes. This posed the problem of devising processes for removing from the calcined magnesite iron, manganese and calcium oxide impurities to obtain an end product of the desired chemical analysis. The starting material is usually a native magnesite containing at least about 2% by weight of iron, in the form of ferric oxide ($Fe_2O_3$).

Theoretically, the purification, i.e. the removal of the oxides, may be effected by treating the calcined magnesite with chlorine compounds. However, it has been impossible to effectuate such chlorination on an industrial scale without making the end product prohibitively expensive. Therefore, it has been found more economical in such countries where only magnesites with a relatively high content of undesirable impurities were available, to import purer types of native magnesite. However, such magnesite types have differing compositions from batch to batch so that further treatment still was needed to arrive at an end product of uniform composition of the desired analysis.

It is the primary object of the present invention to purify native magnesites, whose content of impurities in relation to their intended use is relatively high, in an economical manner and so that the end product is a calcined or dead-burned magnesia of great uniformity in composition useful for making refractory shapes.

It is a more specific object of this invention chemically to change the composition of native magnesite by subjecting the magnesite to treatment with hydrogen chloride at an elevated temperature, with the result that end products of specifically circumscribed composition for any desired use may be economically produced from a native magnesite of a composition such as found in Austria, for instance.

The following types of magnesia are mostly in commercial demand today:

(1) Very pure sintered magnesia with an MgO content of at least 97%, by weight. This is practically pure periclase.

(2) Sintered magnesia which is practically free of iron and manganese oxide impurities but contains a combined amount of silica and lime of less than 5%, preferably less than 4%, by weight, with a weight ratio of lime to silica of more than 2:1. For instance, the magnesia may contain 3% lime and 1% silica.

(3) The same as (2) but with a lime content less than that of silica, i.e. 1% lime and 3% silica.

Thus, the problem solved by the present invention is the economically feasible production of a selected type of magnesia within the above composition limits from a native magnesite of relatively high ferric oxide and lime content, which contains an amount of silica and alumina required in the end product.

Removing undesirable impurities, such as iron, calcium, manganese and boron, by subjecting a starting material to chlorination to obtain magnesia is known. For instance, in U.S. Pats. Nos. 2,487,497 and 2,571,983, it has been proposed to treat comminuted magnesium compounds in a reducing atmosphere with chlorine-containing gases at temperatures between 800° C. and 1500° C. to remove iron, boron, and manganese therefrom. In these known processes, iron and manganese are first chlorinated at a temperature of about 1100° C. and boron and calcium are then chlorinated at temperatures between about 1200° C. and 1400° C. It has also been proposed to calcine the resultant magnesium chlorides in an oxidizing atmosphere to convert them to MgO.

These known processes are designed to produce an end product of very high purity for pharmaceutical uses and in high temperature-resistant electrical insulators, for instance. Such degrees of purity are not needed for magnesia used in refractory bricks for metallurgical vessels—which is the sole end use of the products contemplated by the present invention. As a matter of fact, such high purity would make the products often useless for this contemplated end use because the resistance to temperature changes of shapes made of pure magnesia is insufficient. For these end uses contemplated by this invention, the starting material must be a native magnesite containing some ferric oxide or lime, or both, to produce useful refractory bricks, as well as silica and alumina. These requirements make it possible to devise an economically feasible chlorination process for making high-quality refractories from native magnesite.

The first step in this process is the selection of a native magnesite which contains an amount of silica ($SiO_2$) and alumina ($Al_2O_3$) desired in the composition of the end product and not exceeding the permissible limits. Another essential requirement for an industrial process of this type is the economical recovery of the chlorine used in the treatment.

According to the invention, the selected magnesite is first caustically burned and the burned magnesite is subjected to chlorination by treating it with hydrogen chloride gas in the absence of combustible substances, such as combustion gases which form a reducing atmosphere, and in a temperature range between 800° C. and 1100° C. at which iron and manganese are converted into volatile chlorides while calcium oxide is converted into a chloride remaining in the burned magnesite. The amount of hydrogen chloride gas and the reaction temperature, pressure and time are so controlled that the amount of chlorides remaining in an intermediate reaction product is such that they may be removed by after-treatment to obtain the calcined magnesia of a desired chemical analysis. The intermediate product is then subjected to this after-treatment and at least a large part of the hydrogen chloride gas is recovered by any conventional process.

The after-treatment may comprise leaching the calcium values out of the intermediate product to obtain the desired chemical analysis of the magnesia. Alternatively, the after-treatment may comprise subjecting the intermediate product to an oxidizing heating in the presence of water vapor whereby at least a part of the calcium chloride is oxidized.

It should be noted that the present invention is limited to the use of a native magnesite of the above-indicated type as a starting material and to the use of hydrogen chloride gas as the chlorinating agent in a specified temperature range so controlled as to remove the iron in the form of a gaseous iron chloride while the lime content of the magnesite is converted to $CaCl_2$ which is later leached out of an intermediate product of the process or is re-oxidized.

HCl is used as chlorinating agent in the absence of reducing substances because hydrogen chloride, in contrast to gaseous chlorine, reacts more strongly with the lime than with magnesia and unexpectedly fully converts the CaO to $CaCl_2$ while forming very little $MgCl_2$. Thus, in contrast to known processes, little magnesium is converted into $MgCl_2$, which must be leached out of the end product or re-oxidized, thus reducing the magnesia losses, which unfavorably affect the economic feasibility of making high-quality magnesia for refractories.

Forming volatile iron and manganese chlorides while leaving calcium chloride in the magnesite by means of HCl as chlorinating agent can be accomplished only with relatively low and thus economically favorable temperatures which have been found to be in the range of about 800° C. to 1100° C. In contrast to the known processes, the use of hydrogen chloride gas in the absence of reducing gases causes a particularly small formation of $MgCl_2$ and also facilitates the recovery of HCl for re-use.

Thus, I have found that the present industrial process must not proceed in a reducing atmosphere and even a slightly oxidizing atmosphere is not damaging. The chlorination useful for obtaining the desired end products proceeds at least as well in the absence of a reducing atmosphere and has the economic advantage of forming substantially less magnesium chloride.

Also of great importance to the economic feasibility of the present industrial process is the recovery of the hydrogen chloride from the flue gases, as well as the volatile chlorides, which may be carried out by any of the known recovery processes. HCl is recovered primarily from the calcium and iron chlorides and only a little from the magnesium chloride since only small amounts of the latter are formed in the present process.

According to one feature of this invention, the calcium chloride, which remains in the sintered magnesite due to the temperature control during chlorination, may be partially leached out so that a predetermined residual amount of calcium chloride remains in the end product. During the subsequent calcining, which may be effected in the presence of water vapor, the calcium chloride is reconverted into lime which is a necessary component of the types of sintered magnesia produced according to the invention, as indicated hereinabove.

Thus, the native magnesite used as a starting material in this industrial process needs to meet no other requirements than to contain the necessary amounts of silica and alumina which are little or not influenced by the chlorination. The other impurities, which produce the desired qualities of the sintered magnesia in refractories, may be removed in any desired degree by control of the chlorination process. After chlorination, the chemical composition as well as the physical characteristics of the end product are such that high-quality refractories may be produced therefrom by such well known finishing steps as high-temperature sintering, briquetting, comminuting, classifying, pressing, burning, impregnating, etc.

The recovery of the gaseous hydrogen chloride from the volatile iron and manganese chlorides as well as the calcium chloride may be effected by any of the well known processes. Iron chloride, for instance, may be thermically decomposed while calcium chloride may be subjected to treatment with steam at elevated temperatures, with or without the addition of silica or alumina carriers, or it may be reacted with sulfuric acid. The small amounts of magnesium chloride may be converted into magnesia by chemical reaction with lime or thermically. Using the most suitable recovery processes will reduce the loss of HCl to a minimum, which is very important for the economic feasibility of the process.

The following Table I shows the results of using different chlorinating agents on the same native magnesite starting material when subjected to chlorination at a temperature of 1000° C. for two hours, all parts being by weight:

TABLE I

| | Magnesite starting material | Magnesite after caustic burning | Chlorinating agent | | |
|---|---|---|---|---|---|
| | | | $Cl_2$-gas | HCl+ CO-gas | HCl gas |
| Weight percent reduction | | 50.36 | 46.10 | 50.87 | 52.18 |
| $CO_2$ | 50.36 | | | | |
| Si | 0.22 | 0.44 | 0.37 | 0.41 | 0.50 |
| Fe | 2.20 | 4.43 | 0.02 | 0.16 | 0.25 |
| Al | 0.20 | 0.40 | 0.33 | 0.41 | 0.50 |
| Mn | 0.25 | 0.50 | 0.22 | 0.14 | 0.21 |
| Ca | 1.34 | 2.70 | 2.41 | 2.65 | 2.68 |
| Mg | 26.18 | 52.74 | 47.37 | 52.19 | 53.72 |
| O | 19.25 | 38.78 | 27.61 | 33.46 | 35.65 |
| Cl | | | 21.67 | 10.58 | 6.48 |
| Calculated on the basis of chemical analysis.* | | | | | |
| $SiO_2$ | | | 0.80 | 0.88 | 1.07 |
| $Al_2O_3$ | | | 0.63 | 0.77 | 0.94 |
| $FeCl_3$ | | | 0.06 | 0.47 | 0.73 |
| $MnCl_2$ | | | 0.50 | 0.33 | 0.48 |
| $CaCl_2$ | | | 4.77 | 5.23 | 5.29 |
| $MgCl_2$ | | | 25.51 | 10.09 | 4.18 |
| MgO | | | 67.74 | 82.23 | 87.31 |
| Percent content of chlorinated mg.-portion | | | 13.8 | 5.0 | 2.0 |

*The calculation is based on the findings that the chlorination essentially does not change the $SiO_2$ and $Al_2O_3$ contents, while manganese and iron are present in the form of their chloride and calcium is present practically completely in the form of $CaCl_2$.

As the above table shows, the essential difference between using different chlorinating agents under otherwise identical reaction conditions is in the substantially lower chlorinated Mg-portion (2%) with the use of pure HCl gas, while this portion is 13.8% with the use of chlorine gas and 5% when HCl is used in the reducing atmosphere provided by CO-gas, the remainder of the magnesium portions being magnesia. Corresponding amounts of Cl-containing compounds are present in the chlorinated products, which determines the recovery of HCl and is of economic importance. The best results in this respect are obtained when the HCl-gas is used in the absence of oxidizable substances.

The following Table II shows the chemical analysis of the end product obtained from the starting material of Table I and from a different native magnesite starting (a) Starting material of Table I:

TABLE II

|  | Magnesite after caustic burning | HCl-chlorinated and completely leached | HCl-chlorinated and partially leached |
|---|---|---|---|
| Weight percent reduction | 50.36 | 57.05 | 55.36 |
| $SiO_2$ | 0.95 | 1.19 | 1.05 |
| $Fe_2O_3$ | 6.34 | 0.39 | 0.38 |
| $Al_2O_3$ | 0.77 | 1.05 | 1.01 |
| $Mn_3O_4$ | 0.70 | 0.33 | 0.31 |
| $CaO$ | 3.79 | 0.14 | 2.91 |
| $MgO$ | 87.45 | 96.90 | 94.34 |

(b) Different native magnesite starting material:

|  | Magnesite after caustic burning | HCl-chlorinated and partially leached |
|---|---|---|
| Weight percent reduction | 49.47 | 58.49 |
| $SiO_2$ | 1.65 | 2.00 |
| $Fe_2O_3$ | 7.91 | 0.34 |
| $Al_2O_3$ | 0.72 | 0.87 |
| $Mn_3O_4$ | 0.48 | 0.19 |
| $CaO$ | 9.08 | 0.48 |
| $MgO$ | 80.16 | 96.12 |

The above examples show that, while the desired silica and alumina content is maintained, the iron and manganese content of the end product is practically eliminated, and the lime content may be adjusted within wide limits according to the desired optimum analysis dependent on the end use.

EXAMPLE

A native magnesite having the chemical analysis of the starting material of Table I was caustically burned at a temperature of 1000° C. until it contained no carbon dioxide (see column 2 of Table I) and the periclase crystals of the product had an average diameter of about 0.1 m$\mu$. The hot burned magnesite having a temperature of about 950° C. was introduced into a tall reaction vessel whose walls were of a refractory capable of withstanding temperatures up to about 1200° C. and inert to hydrogen chloride, i.e. fire clay or silica brick. The reaction vessel had an upper inlet and a lower outlet for the material to be chlorinated, as well as a lower inlet for hydrogen chloride gas and a flue for removing gases from the reaction vessel.

After the reaction vessel was filled with the hot burned magnesite, gaseous HCl, free of reducing gases such as CO or other combustible gases but containing a small amount of water vapor establishing a slightly oxidizing atmosphere, was heated in an heat exchanger and introduced into the lower gas inlet at a temperature of 1000° C. The pressure within the vessel was kept slightly below one atmosphere to make certain that no hydrogen chloride gas escaped.

Twice the stoichiometric amount of HCl gas necessary to chlorinate all impurities of the burned magnesite, which can be chlorinated, was used and chlorination was continued for about an hour and a half. The chlorination process was continuous, treated magnesite being removed from the vessel every ten minutes through the lower outlet while a corresponding amount of burned magnesite was added at the upper inlet and the necessary amount of HCl was metered in. The volatile chlorides, unused portions of the HCl gas and other gaseous reaction products were removed through the flue.

Since the chlorination proceeds exothermically, no heating was required and the temperature was maintained at about 1000° C. throughout the chlorination. If substantial heat losses were encountered, however, due to poor heat insulation of the reaction vessel, the burned magnesite may be introduced into the vessel at a somewhat higher temperature and/or the temperature of the HCl gas may be raised to about 1050° C.

If it is desired to produce an end product containing no or only a given amount of calcium values, the chlorinated material is washed out with water to a desired extent. This leaching will also remove any other chlorides retained in the magnesite.

The HCl gas is removed from the flue gases and from the leached out chlorides by thermal splitting and the following reactions, respectively:

(1)      $CaCl_2 + H_2O = CaO + 2HCl$
(2)      $CaCl_2 + H_2SO_4 = CaSO_4 + 2HCl$
(3)      $MgCl_2 + H_2O = MgO + 2HCl$
(4)      $MgCl_2 + CaO = CaCl_2 MgO$

I claim:

1. An industrial process for changing the chemical composition of native magnesite containing iron, manganese and calcium as impurities, as well as silica and alumina, to obtain calcined magnesia of optimum chemical analysis for use in refractories, the amount of the silica and alumina in the native magnesite being selected in relation to the permissible content thereof in the magnesia, comprising the steps of first caustically burning the magnesite, then subjecting the burned magnesite to chlorination by treating it with hydrogen chloride gas in the absence of combustible or reducing gases and in a temperature range between 800° C. and 1100° C. to convert iron and manganese into volatile chlorides while calcium is converted into calcium chloride remaining in the burned magnesite, removing the volatile iron and manganese chlorides, and leaching a portion of said calcium chloride out of the intermediate product so obtained until the product has a desired calcium content.

2. The industrial process of claim 1, wherein the leaching is effected at an elevated temperature.

3. An industrial process for changing the chemical composition of native magnesite containing iron, manganese and calcium as impurities, as well as silica and alumina, to obtain calcined magnesia of optimum chemical analysis for use in refractories, the amount of the silica and alumina in the native magnesite being selected in relation to the permissible content thereof in the magnesia, comprising the steps of first caustically burning the magnesite, then subjecting the burned magnesite to chlorination by treating it with hydrogen chloride gas in the absence of combustible or reducing gases and in a temperature range between 800° C. and 1100° C. to convert iron and manganese into volatile chlorides while calcium is converted into calcium chloride remaining in the burned magnesite, removing the volatile iron and manganese chlorides, and subjecting the intermediate product so obtained to calcination in the presence of water vapor until at least a portion of said calcium chloride is converted to calcium oxide.

References Cited

UNITED STATES PATENTS

| 1,661,043 | 2/1928 | Koehler | 23—201 |
| 2,487,497 | 11/1949 | Vettel | 23—201 |
| 2,571,983 | 10/1951 | Woodward | 23—201 |

OSCAR R. VERTIZ, Primary Examiner

G. T. OZAKI, Assistant Examiner